United States Patent

Nakamura

[11] Patent Number: 5,286,102
[45] Date of Patent: Feb. 15, 1994

[54] BRAKE CONTROL DEVICE

[75] Inventor: Hirotaka Nakamura, Tokyo, Japan

[73] Assignee: Akebono Brake Industry Co., Ltd., Tokyo, Japan

[21] Appl. No.: 929,757

[22] Filed: Aug. 12, 1992

[30] Foreign Application Priority Data

Aug. 13, 1991 [JP] Japan .................. 3-203029

[51] Int. Cl.$^5$ ............................................. B60T 8/32
[52] U.S. Cl. .................. 303/113.2; 303/115.2; 303/118.1; 303/119.2
[58] Field of Search .............. 303/113.2, 118.1, 119.2, 303/115.1, 115.4, 15, 115.2, 2

[56] References Cited

U.S. PATENT DOCUMENTS

| | | | |
|---|---|---|---|
| 4,889,395 | 12/1989 | Fujita et al. | 303/115.1 |
| 4,973,108 | 11/1990 | Maki et al. | 303/118.1 |
| 5,100,208 | 3/1992 | Angermair | 303/118.1 X |
| 5,184,878 | 2/1993 | Woerner | 303/118.1 |

FOREIGN PATENT DOCUMENTS

| | | | |
|---|---|---|---|
| 3061153 | 3/1991 | Japan | 303/118.1 |
| 3065460 | 3/1991 | Japan | 303/118.1 |
| 4090954 | 3/1992 | Japan | 303/115.4 |
| 2226858 | 7/1990 | United Kingdom | 303/115.1 |
| 2251278 | 7/1992 | United Kingdom . | |

Primary Examiner—Robert J. Oberleitner
Assistant Examiner—Kevin D. Rutherford
Attorney, Agent, or Firm—Knobbe, Martens, Olson & Bear

[57] ABSTRACT

In a brake control device with a traction control function, there is provided a traction control valve for connecting a first conduit extending from a first pressure source to a brake valve to a second conduit extending from a second pressure source for arbitrarily switching the route of the pressure of air supplied from the traction valve to the modulator. With this construction, it is possible to obtain the compact brake control device capable of reducing the number of parts and enhancing the brake responsiveness with a low cost.

3 Claims, 5 Drawing Sheets

BRAKE CONTROL DEVICE

BACKGROUND OF THE INVENTION

The present invention relates to a brake control device in an air over hydraulic brake system mounted on an automobile.

In the brake control device of this type, as an air modulator for controlling oil pressure supplied to a wheel cylinder by air pressure, there has been known a structure having an air over hydraulic cylinder containing an air piston on one side and a hydraulic piston on the other side.

The above modulator has a housing integrally formed with a solid valve unit composed of two kinds of solenoid valves (hold valve and decay valve) for controlling the suction, holding and discharge of air to an air chamber side of the air piston.

Figure 4:
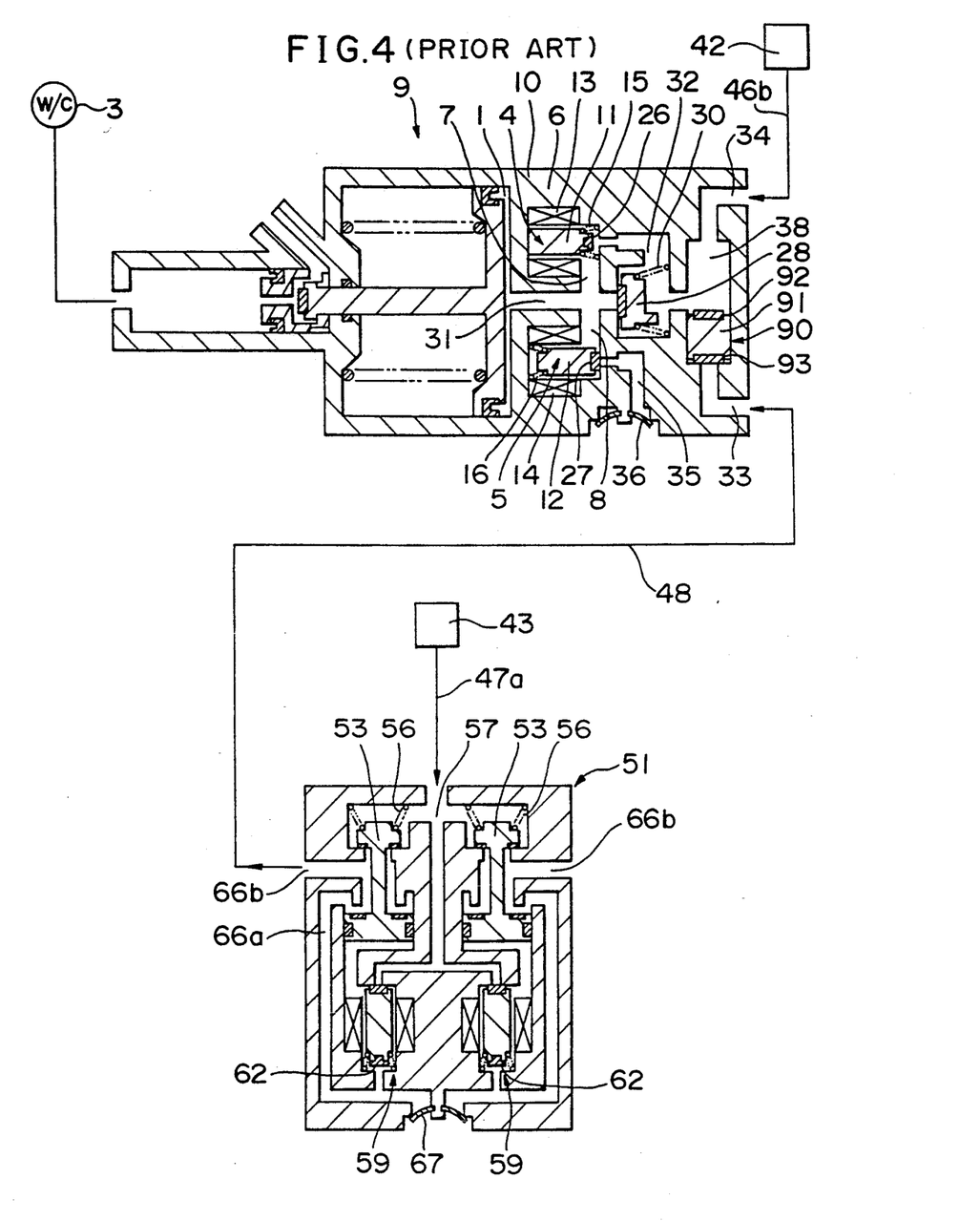
FIG. 4 is a cross-sectional side view showing an internal construction of a modulator and a traction control valve of a conventional example.

Further, there may be considered such a brake control device including a traction control mechanism in addition to the above brake control device, as shown in FIG. 4.

Figure 5:
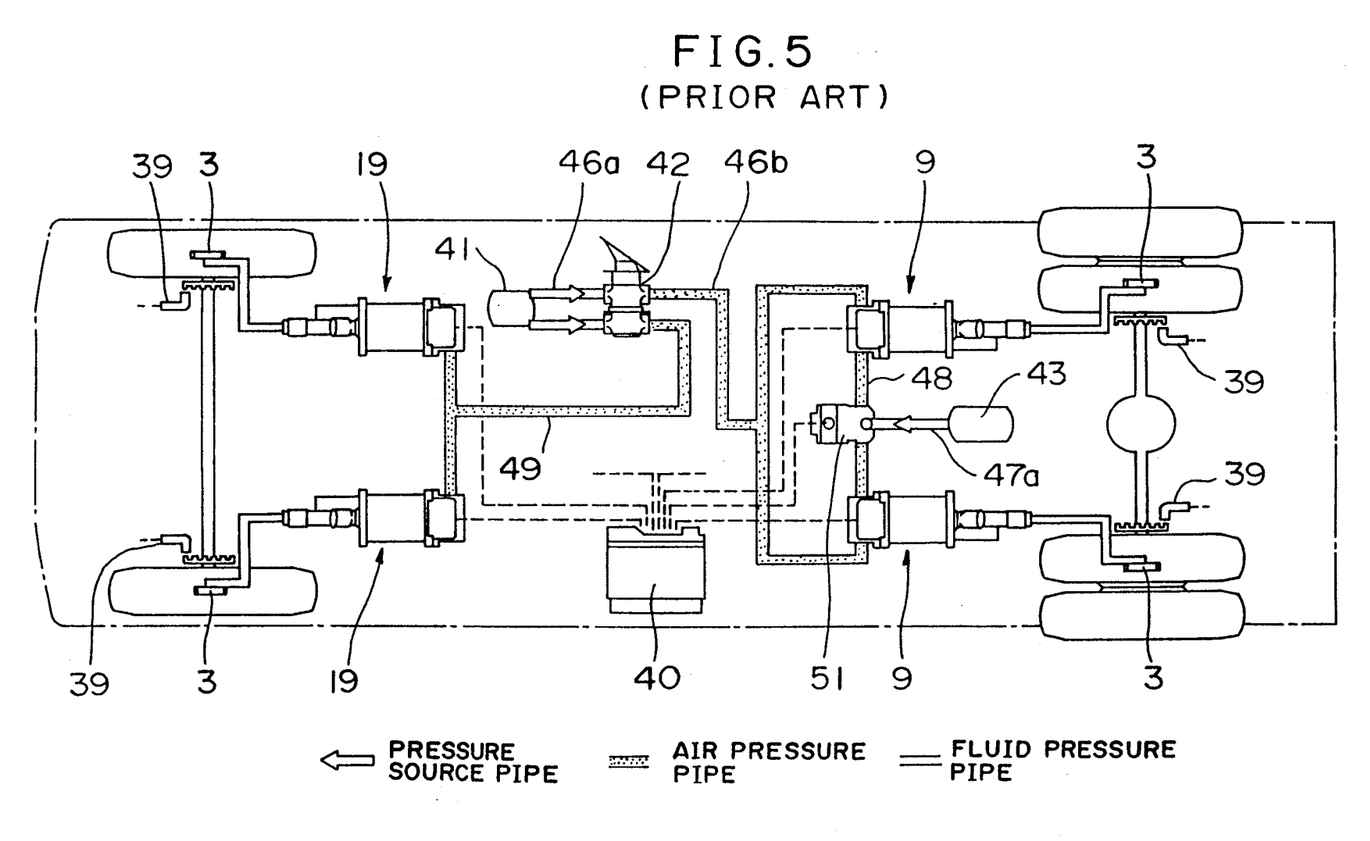
FIG. 5 is a block diagram showing a vehicle brake system in a conventional example.

FIG. 5 shows the whole construction of a vehicle brake system including this brake control device.

In this figure, a first conduit 46a extending from an air tank 41 as a first pressure source is connected to a brake valve 42. A first conduit 46b extending from the brake valve 42 is connected to modulators 9 provided on the rear side, that is, the drive wheel side. A second conduit 47 extending from an air tank as a second pressure source is connected to a traction control valve 51. A third conduit 48 extending from the traction control valve 51 is connected to the modulator 9. Also, the brake valve 42 is connected to modulators 19 on the front wheel side through a fourth conduit 49.

A speed sensor 39 is disposed on each of the front and rear wheels for detecting rotation of each wheel for feeding the detection signal to a Electric Control Unit 40 (ECU).

In the ECU 40, the traction control valve 51, and the modulators 9 and 19 are activated according to the detection signal from the speed sensor 39 and a brake pedal for controlling the brake of each wheel.

The modulator 9 as shown in FIG. 4 will be explained. A hold valve 4 and a decay valve 5 are disposed in parallel to each other in the modulator 9.

The hold valve 4 has a hold plunger 11 axially movable in a hollow portion of a solenoid coil 13, and a rubber made hold valve main body 26 is provided in the right end (in this figure) of the hold plunger 11. The hold valve 4 is biased in the left in a housing 10 of the modulator 9 by a hold spring 15, and is usually opened to a communicating passage 32 as an air supply passage.

A communicating passage 38 is formed at the right end portion of the valve unit 6. The communicating passage 38 is communicated to three ways, that is, a supply passage 34 for supplying air from the brake valve 42, a supply passage 33 for supplying air from a traction control valve 51 described later and the communicating passage 32.

A shuttle valve device 90 for controlling air flow is provided in the above communicating passage 38.

In the shuttle valve device 90, a shuttle valve piston 91 is slidably disposed in the communicating passage 38, and valve rubbers 92 and 93 are respectively attached on both ends of the shuttle valve piston 91.

In the communicating passage 32, a return valve 28 permitting air flow from a chamber passage 31 to the communicating passage 38 side is biased in the left (in this figure) by a return spring 30.

The communicating passage 32 is connected through the return valve 28 to a hold valve chamber 7, a decay valve chamber 8 and the chamber passage 31.

The decay valve 5 has a decay plunger 12 axially movable in a hollow portion of the solenoid coil 14, and a rubber made decay valve main body 27 is provided at the right end (in this figure) of the decay plunger 12.

The decay valve 5 is usually biased on an exhaust passage 35 side by a return spring 16 to close the exhaust passage 35 communicated to an exhaust valve 36.

The traction control valve 51 as shown in the lower side in FIG. 4 will be described below.

The traction control valve 51 has a pair of valve pistons 53 in the upper side (in this figure) and a pair of solenoid valve bodies 59 in the lower side (in this figure) centered on an air supply passage 57 communicated to a second conduit 47a from an air tank 43. The valve piston 53 functions as a control valve usually closed to the air supply passage 57 by a return spring 56 for controlling the supply of air to an air pressure passage 66b.

In the air pressure passage 66b, one end is communicated to a third conduit 48 and the other end is communicated to an air pressure passage 66a. Also, in the air pressure passage 66a, one end is communicated to the decay valve 62 side of the solenoid valve body 59 and the other end is communicated to an exhaust valve 67.

Thus, air made to flow in the communicating passage 38 from the brake valve 42 and the air tank 43 through the traction control valve 51 is supplied to an air chamber through the hold valve 4 side by activation of the shuttle valve device 90, and also each solenoid valve is activated, to thereby execute the brake control.

However, the brake control device as shown in FIGS. 4 and 5 has a disadvantage of making the construction thereof complex: namely, achieving the traction braking requires the shuttle valve device 90 for controlling air pressure, the exhaust valve 67 of the traction control valve 51 and the accompanying conduits; and further the number of the parts of each device is increased.

Further, by the presence of the conduit between the modulator 9 and the traction control valve 51, the preferable brake responsiveness requires a large flow rate, which enlarges the size of the device.

Taking the above into consideration, the present invention has been made, and the object is to provide a compact brake control device capable of reducing the number of parts and improving the brake responsiveness with a low cost.

SUMMARY OF THE INVENTION

According to the present invention, there is provided a brake control device comprising: a brake valve 42 provided in a first conduit 46 connecting a first pressure source 41 to a wheel cylinder 3; a modulator 9 positioned between the brake valve 42 and the wheel cylinder 3 for controlling the pressure applied to the wheel cylinder 3; a traction control valve 51 positioned between the brake valve 42 and the modulator 9 and adapted to be activated in traction control; and a second conduit 47 for supplying the pressure from a second pressure source 43 to the traction control valve 51.

The traction control valve 51 directly connects the first conduit 46 extending from the brake valve 42 to the second conduit 47 extending from the second pressure source 43, thereby controlling the pressure from the brake valve 42 and the second pressure source 43 for supplying the controlled pressure to the modulator 9.

The modulator 9 may be integrated with the traction control valve 51 directly connecting the first conduit 46 extending from the brake valve 42 to the second conduit 47 extending from the second pressure source 43 and controlling the pressure.

According to the present invention, in brake control, air supplied from the brake valve 42 to the traction control valve 51 is supplied to the air chamber 1 through the third conduit 48, the communicating passage 32 of the modulator 9 and the hold valve 4 side, to thereby execute the brake control.

Also, in traction brake control, air from the brake valve 42 is cut-off in the traction control valve 51 and is not communicated to the air chamber 1. The air supplied from the second pressure source 43 to the traction control valve 51 is supplied to the air chamber 1 through the third conduit 48, the communicating passage 32 of the modulator 9 and the hold valve 4 side, to execute the brake control.

In release of the braking, air in the air chamber 1 is made to pass through the hold valve 4 side, communicating passage 32, supply passage 33, third conduit 48, traction control valve 51 and first conduit 46, and is exhausted from the exhaust valve of the brake valve 42.

Further, since the traction control valve 51 is integrated with the modulator 9, air from the brake valve 42 and the second pressure source 43 is supplied directly from the first conduit 46 and the second conduit 47 to the traction control valve body in the modulator, passing through the communicating passage 32 without any conduits, and is supplied from the hold valve 4 side to the air chamber 1, thereby executing the brake control.

As mentioned above, according to the brake control device of the present invention, by sharing many parts and improving the brake responsiveness, it is possible to reduce the number of the parts and miniaturize the whole device.

DESCRIPTION OF THE PREFERRED EMBODIMENT

Embodiment 1

Hereinafter, a first embodiment of the present invention will be described with reference to FIGS. 1 and 2.

Figure 2:
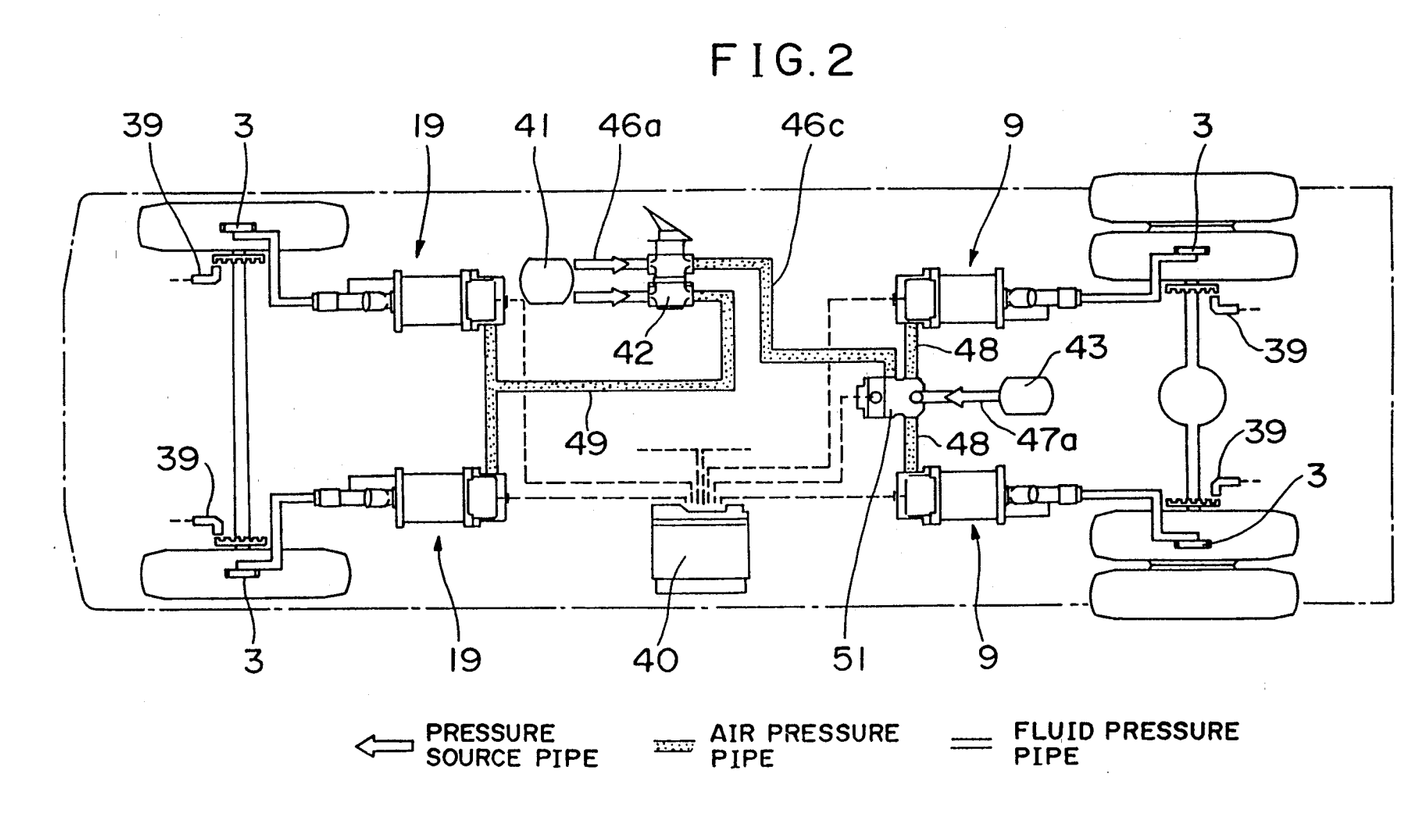
FIG. 2 is a block diagram showing a vehicle brake system in the first embodiment.

A brake control device according to this embodiment is disposed in a vehicle brake system as shown in FIG. 2.

A first conduit 46a extending from an air tank 41 as a first pressure source is connected to a brake valve 42, from which a first conduit 46c is connected to a traction control valve 51. A second conduit 47a extending from an air tank 43 as a second pressure source is connected to the traction control valve 51, from which third conduits 48 are respectively connected to modulators 9 on a rear wheel side, that is, a drive wheel side. Also, the brake valve 42 is connected to modulators 19 on a front wheel side through a fourth conduit 49.

A speed sensor 39 is disposed on each of front and rear wheels to detect rotation of each wheel and to feed the detection signal to a Electric Control Unit 40 (ECU).

The ECU 40 activates the traction control valve 51 and modulators 9 and 19 on the basis of the detection signals from the speed sensor 39 and a brake pedal, to thus control the braking condition of each wheel.

The above modulator will be explained with reference to FIG. 1.

The modulator 9 is composed of a modulator unit 44 and a valve unit 6, and the modulator unit 44 includes an air cylinder 17 and a hydraulic housing 45.

The air cylinder 17 internally includes an air piston 2 axially movable, and a piston rod 24 movable by being interlocked with the air piston 2.

The air piston 2 is usually biased on the valve unit 6 side by a piston return spring 18 with one end engaged with the inner end surface of the hydraulic housing 45 to compress an air chamber 1 formed between the air piston 2 and the valve unit 6. Also, an air cup 25 is fitted around the periphery of the air piston 2, thereby preventing air leakage from the air chamber 1.

The hydraulic housing 45 includes a hydraulic cylinder 20 having a diameter smaller than that of the above air cylinder 17. Within the hydraulic cylinder 20, a hydraulic piston 21 connected to the end portion of the piston rod 24 is movably mounted. On the leading end side of the hydraulic cylinder 20, there is formed a hydraulic outlet 23 communicated to a wheel cylinder 3.

Also, on a stepped portion of the hydraulic housing 45, there is formed a hydraulic inlet 22 for communicating the hydraulic cylinder 20 to an external reservoir (not shown). With this construction, braking liquid is supplied from the reservoir (not shown) to the hydraulic cylinder 20 through the hydraulic inlet 22.

In addition, the hydraulic inlet 22 is internally fitted with a check valve (not shown) for giving a specified residual pressure to the wheel cylinder(W/C).

The construction of the valve unit 6 will be explained below.

Figure 1:
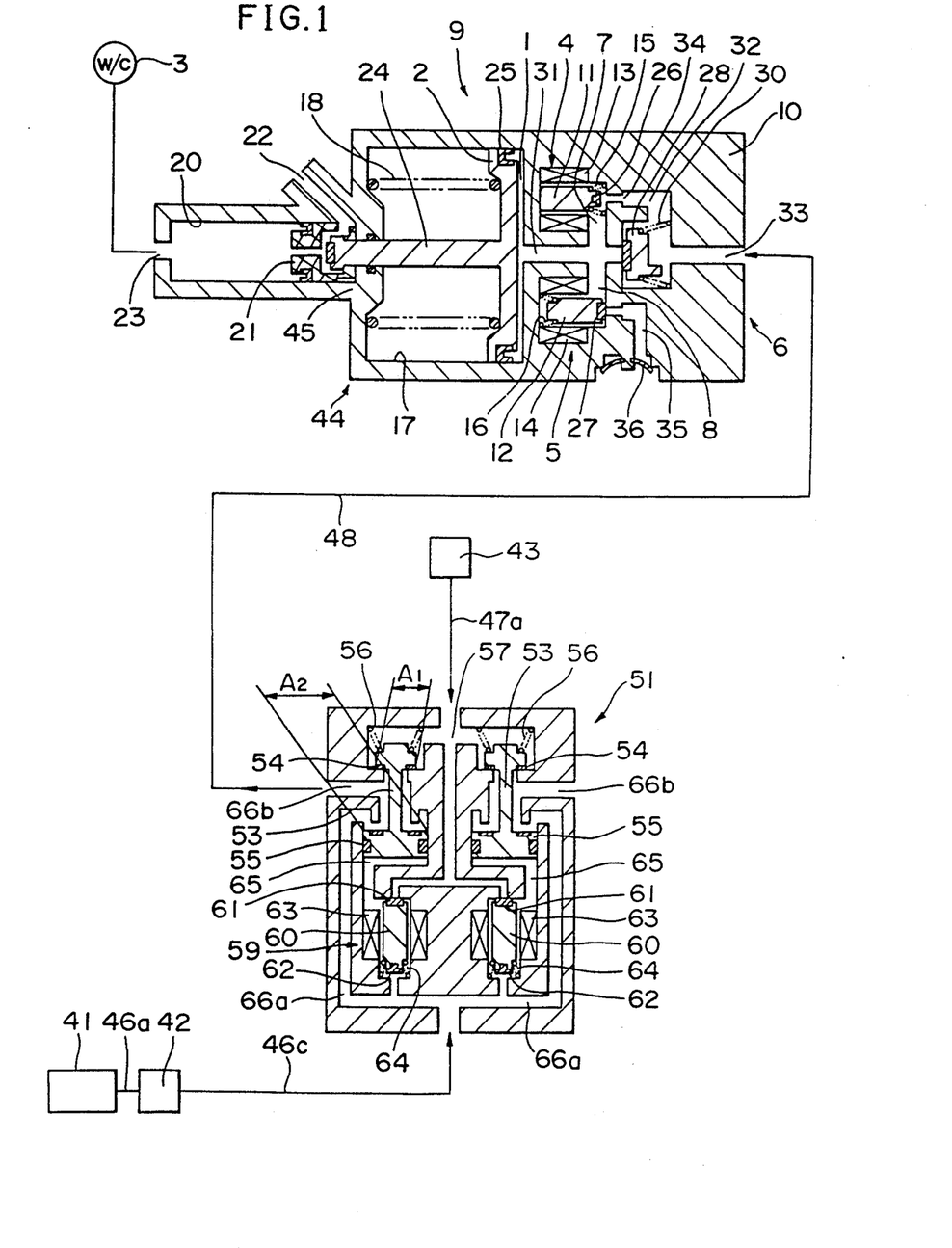
FIG. 1 is a cross-sectional side view showing an internal construction of a modulator and a traction control valve of a brake control valve according to a first embodiment of the present invention.

The valve unit 6 in this embodiment has a hold valve 4 on the upper side and a decay valve 5 on the lower side, as shown in FIG. 1.

Solenoid coils 13 and 14, each being wound around a bobbin, are provided on the hold valve 4 side and the decay valve 5 side respectively.

A hold plunger 11 axially movable in a hollow portion of the solenoid coil 13 is provided on the hold valve 4 side, and a hold valve main body 26 made of rubber is provided in the right side of the hold plunger 11.

The above hold plunger 11 is biased in the left (in this figure) by a hold spring 15. Accordingly, when the solenoid coil 13 is not activated, the hold valve 4 functions as a control valve usually opened to a communicating passage 32 as an air supply route.

Within the communicating passage 32, a return valve 28, which permits only the air flow from a chamber passage 31 communicated to the air chamber to a supply passage 33 side, is biased in the left (in this figure) by a return spring 30.

The chamber passage 31 is communicated not only to the air chamber 1 but also to a hold valve chamber 7 on the hold valve 4 side, a decay valve chamber 8 on the decay valve 5 side and the communicating passage 32.

The decay valve 5 includes a decay plunger 12 axially movable in a hollow portion of the solenoid coil 14, and a decay valve main body 27 made of rubber at the right end (in this figure) of the decay plunger 12.

When the solenoid coil 14 is not activated, the decay plunger 12 is biased in the right in the housing 10 by a return spring 16, and accordingly, the decay valve 5 functions as a control valve usually closed to an exhaust passage 35 communicated with an exhaust valve 36.

Next, the traction control valve will be explained below.

An air supply passage 57 communicated to a second conduit 47a extending from an air tank 43 is formed in the traction control valve 51, and a pair of valve pistons 53 each having upper and lower seal bodies 54 and 55 are respectively disposed on both sides of the air supply passage 57. The valve piston 53 functions as a control valve usually closed to the air supply passage 57 by a return spring 56 for controlling the supply of air to an air pressure passage 66b as an air supply passage to the modulator 9.

In this figure, the diameter $A_1$ of the seal body 54 disposed in the air supply passage 57 side is smaller than the diameter $A_2$ of the lower seal body 55. Consequently, in the usual state, the air flow from the air supply passage 57 to the air pressure passage 66b is cut-off by the pressure from the air tank 43 and the energizing force of the return spring 56, and further, in exciting each solenoid coil 63 for moving a plunger 60 described later in the air pressure passage 66a side, the valve piston 53 is moved by the pressure applied from the air tank 43 to the diameter $A_2$ of the seal body 55.

A solenoid valve body 59 is formed such that the solenoid coil 63 is wound around a bobbin, and includes the plunger 60 axially movable in the hollow portion thereof.

The plunger 60 has rubber valves on the upper and lower ends, respectively. The plunger 60 is biased upwardly (in this figure) by a return spring 64. Accordingly, the upper end side functions as the hold valve 61 usually closed to the air supply passage 57, and the lower end side functions as a decay valve 62 usually opened to an air pressure passage 66a communicated to a brake valve 42.

In the traction control valve 51, the air pressure passage 66a is communicated at one end side to the air pressure passage 66b and is communicated at the other end side to the first conduit 46c communicated to the brake valve 42, and is formed in such a manner as to surround the lower side of the solenoid valve body 59 and the valve piston 53.

In addition, a chamber 65 to which air flows from the hold valve 61 is formed between the valve piston 53 and solenoid valve body 59.

The operation of this embodiment will be described below.

First, in braking, air from the brake valve 42 is supplied in the traction control valve 51 in which each hold valve 61 is closed to the air supply passage 57 (without exciting each solenoid coil 63), passing through the air pressure passage 66 and the third conduit 48, and is made to flow in the modulator 9 from the supply passage 33. Then, the air is supplied from the communicating passage 32 to the air chamber 1 through the hold valve 4 side, to execute the brake control.

In this case, when the ECU 40 detects the wheel locking possibility on the basis of the signal from each speed sensor 39, the solenoid coil 13 on the hold valve main body 26 side in the valve unit 6 is excited at a specified voltage to close the hold valve main body 26 thereby stopping the supply of air to the air chamber 1. At the same time, the solenoid coil 14 on the decay valve 5 side is excited, to open the decay valve main body 27.

Consequently, air in the air chamber 1 is exhausted in the following route: chamber 31→decay valve chamber 8→exhaust passage 35→exhaust valve 36. The air piston 2 in the modulator 9 is thus moved in the direction of compressing the air in the air chamber 1 by the bias force of the piston return spring 18 and the hydraulic pressure applied to the hydraulic piston 21. Further, since the hydraulic piston 21 is interlocked with the above action, the braking liquid in the wheel cylinder 3 is attracted toward the modulator 9 and reduced in pressure, thereby preventing locking of each wheel.

In holding the liquid pressure in the wheel cylinder 3, both the hold valve main body 26 and the decay valve main body 27 are closed, to thus seal air in the air chamber 1.

In re-pressurizing the interior of the wheel cylinder 3, the hold valve main body 26 is opened while closing the decay valve main body 27, so that air from the third conduit 48 is supplied from the hold valve 4 side to the air chamber 1 again.

The operation in traction brake control will be explained below.

When the ECU 40 judges an accelerated slip of both or either of the drive wheels on the basis of information from the speed sensor 39 attached on each wheel, both or either of the solenoid coils 63 of the traction control valve 51 are excited at a specified voltage. Thus, the plunger 60 is moved downwardly, so that the hold valve 61 opens the air supply passage 57 side and the decay valve 62 closes the air pressure passage 66a side. Air from the air tank 43 is made to flow in a chamber 65 through the second conduit 47a, the air supply passage 57, and the hold valve 61 side. In this case, since the diameter $A_2$ of the seal body 55 is smaller than the diameter $A_1$ of the seal body 54 in consideration of the pressure from the air tank 43 and the bias force of the hold spring 56, air in the chamber 65 pushes the lower portion of the valve piston 53 against air pressure on the seal body 54 side. Thereby, the valve piston 53 is moved upwardly (in this figure), so that the seal body 55 closes the space between the air pressure passage 66a and the air pressure passage 66b, and the seal body 54 opens the space between the air supply passage 57 and the air pressure passage 66b. Thus, the air from the air tank 43 is made to flow in the modulator 9 through the air pressure passage 66b and the third conduit 48. The air made to flow in the modulator 9 is supplied to the air chamber 1 through the communicating passage 32, the hold valve 4 side, and the chamber passage 31, thus executing the brake control.

Namely, the air from the air tank 43 is supplied in the following route: second conduit 47a→air supply passage 57 in traction control valve 51→seal body 54 side→air pressure passage 66b→third conduit 48→supply passage 33 in modulator 9→communicating passage 32→hold valve chamber 7→chamber passage 31→air chamber 1.

In this case, according to the slip condition of each wheel, the solenoid coils 13 and 14 are excited at a specified voltage to suitably activate the hold valve 4 and decay valve 5 for adjusting the traction brake control.

Next, the operation in release of brake control will be explained below.

Air in the air chamber 1 is made to flow in the communicating passage 32 from the hold valve 4 side, passing through the third conduit 48, the air pressure passage 66 of the traction control valve 51 and the first conduit 46c, and is exhausted from the brake valve 42.

Namely, the air in the air chamber 1 is exhausted in the following route: chamber passage 31a→hold valve chamber 7→communicating passage 32→supply passage 33→third conduit 48→air pressure passage 66b of the traction control valve 51→air pressure passage 66a→first conduit 46c→brake valve 42.

As mentioned above, in this embodiment, the traction control valve 51 controls air from the brake valve 42 used for the usual brake control together with air from the air tank 43 used for the traction control, thus supplying the air to the modulator 9.

Accordingly, there can be eliminated shuttle valve for controlling air from the brake valve and the traction control valve. Also, there can be eliminated an exhaust valve in the traction control valve by directly connecting the air pressure passage 66b to the first conduit extending to the brake valve 42.

Since the conduit of air is simplified as mentioned above, it is possible to reduce loss in air pressure and significantly improve control efficiency, and to reduce the number of parts, miniaturize the the whole size, and reduce the cost.

In addition, the brake control device of this embodiment includes the traction control valve 51 and the accompanying conduits only in the rear wheel side as shown in FIG. 2; however, it may include traction control devices in both the front and rear wheel sides, for example, in a four-wheel drive vehicle.

Embodiment 2

Figure 3:
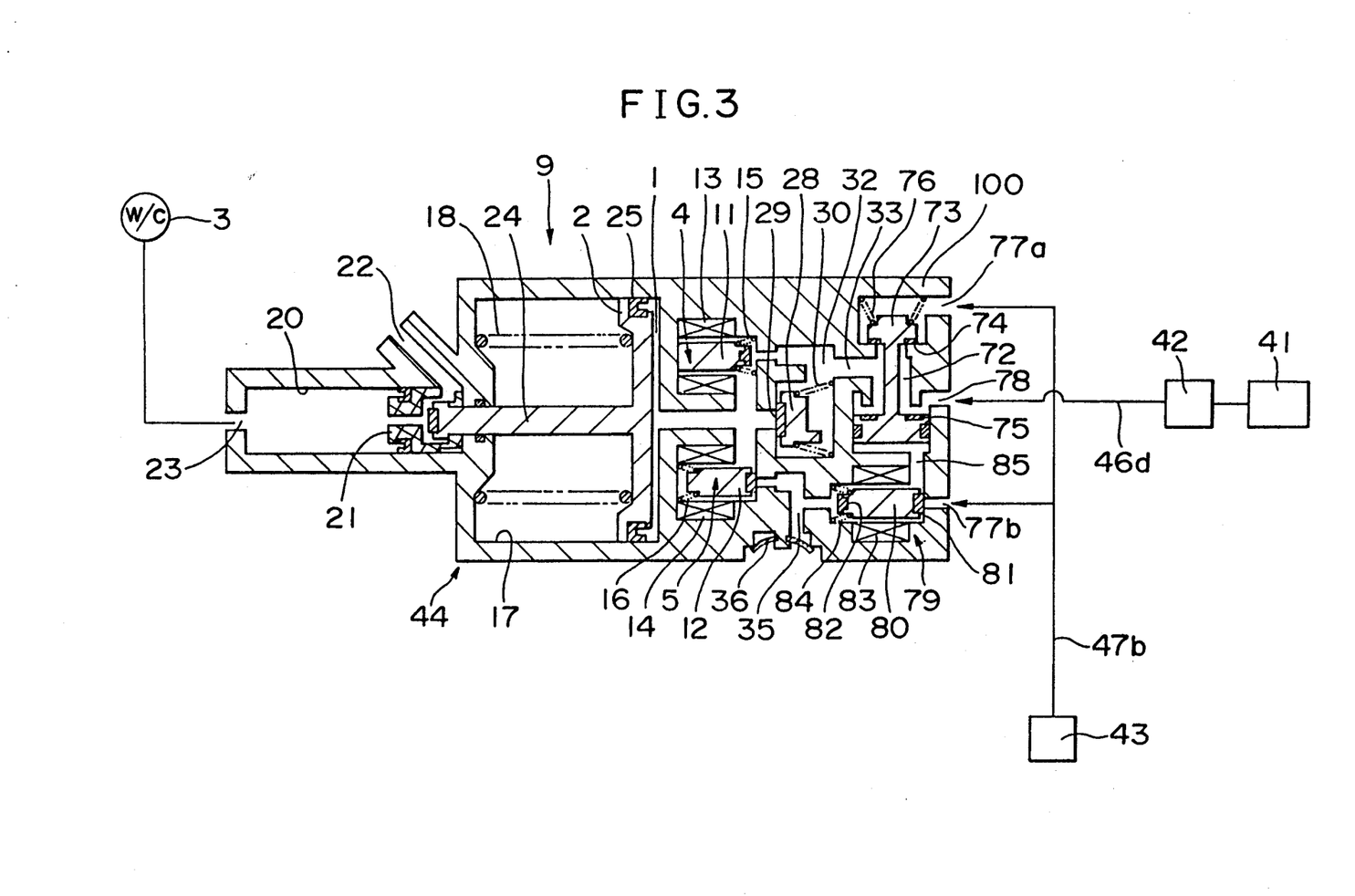
FIG. 3 is a cross-sectional side view showing the internal construction of a modulator section of a brake control device according to a second embodiment.

A second embodiment of the present invention will be explained with reference to FIG. 3.

In this figure, parts similar to those previously described in Embodiment 1 are indicated by the same numerals, and the explanations thereof are omitted.

In a brake control device of this embodiment, a modulator 9 and a traction control valve 51 are integrally contained in a housing 10.

In particular, a valve piston 73 is provided in the upper right end (in this figure) of the modulator 9, and a solenoid valve body 79 is provided in the lower right end (in the figure) of the modulator 9.

The valve piston 73 has seal bodies 74 and 75 formed integrally on the upper and lower sides of a bar-like shaft, each having a diameter larger than that of the bar-like shaft, and is biased downwardly from the housing 100 by a return spring 76.

The diameter of the upper seal body 74 of the valve piston 73 is formed to be smaller than that of the lower seal body 75 in consideration of the pressure from an air tank 43 and the biased force of the return spring 76.

The seal body 74 functions as a control valve usually closed to an air supply passage 77a for supplying air from the air tank 43 from the return spring 76, to control the supply of air to a supply passage 33 communicated to a communicating passage 32.

The seal body 75 functions as a control valve usually opened to an air supply passage 78 for supplying air from a brake valve 42, to thus control the supply of air to the supply passage 33.

The solenoid valve body 79 is formed such that a solenoid coil 83 is wound around a bobbin, and a plunger 80 is provided so as to be axially movable in a hollow portion of the solenoid coil 83. The plunger 80 has rubber made valves on the left and right ends, respectively. The plunger 80 is energized in the right by a hold spring 84, so that the right end portion thereof functions as a hold valve 81 usually closed to an air supply passage 77b, and the left end portion thereof functions as a decay valve 82 usually opened to an exhaust passage 35 communicated to an exhaust valve 36.

A chamber 85 into which air from the hold valve 81 side is made to flow is formed between the valve piston 73 and the solenoid valve body 79.

The operation of this embodiment will be explained below.

First, in braking, air from the brake valve 42 is made to flow in a valve piston chamber 72 through a first conduit 46d and the air supply passage 78, and is supplied to an air chamber 1 through the communicating passage 32 and the hold valve 4 side, thereby executing the brake control.

In this case, as a ECU 40 detects the locking possibility of each wheel on the basis of the signal from each speed sensor 39, the anti-locking control is executed in the same manner as in Embodiment 1.

The operation in traction brake control will be explained below.

As the ECU 40 judges the accelerated slip of both or either of drive wheels on the basis of information from the speed sensor 39 attached on each wheel, the solenoid coil 83 of the applied modulator is excited at a specified voltage. In this case, the plunger 80 is moved in the left, so that the hold valve 81 opens the air supply passage 77b side and the decay valve 82 closes the exhaust 35 side.

Thus air from the air tank 43 is made to pass through the air supply passage 77b and to flow in the chamber 85 from the hold valve 81 side.

In this case, the diameter of the seal body 75 is formed to be larger than that of the seal body 74 in consideration of the pressure from the air tank 43 and the bias force of the hold spring 76.

Accordingly, air in the chamber 85 pushes the lower portion of the valve piston 73 against the air pressure on the supply passage 77 side, and thereby the valve piston 73 is moved upwardly (in this figure). Thus the seal body 75 closes a space between the air supply passage 78 and the supply passage 33 as the third conduit, and the seal body 74 opens a space between the air supply passage 77a and the supply passage 33 as the third conduit, so that air from the air tank 43 is made to flow in the communicating passage 32 through the seal body 74 side and the supply passage 33 as the third conduit.

The air made to flow in the communicating passage 32 is supplied from the chamber passage 31 to the air chamber 1 through the hold valve 4 side, thereby executing the traction control.

In this case, according to the slip condition of each wheel, each of the solenoid coils 13 and 14 is excited at a specified voltage to suitably activate the hold valve 4 and the decay valve 5 thereby adjusting the pressure in a wheel cylinder.

When the solenoid coil 83 is stopped exciting by release of a traction brake mode, the plunger 80 is move in the right (in this figure) and thereby the hold valve 81 cuts off air from the air tank 43 to exhaust air in the chamber 85 from the exhaust valve 36 through the decay valve 82 side an d the exhaust passage 35.

The brake control device of this embodiment may includes a shuttle valve mechanism (not shown) in place of the valve piston 73 positioned in the upper right end of the modulator.

As mentioned above, this embodiment is so constructed that the traction control valve is integrally formed in the modulator thereby directly supplying not only air from the brake valve 42 to be used for the usual brake control but also air from the air tank 43 to be used for traction control to the modulator from the first conduit 46 and the second conduit 47.

Accordingly, the housing and exhaust parts in the traction control valve can be eliminated. Also, since the distance between the air chamber and the traction control valve is shortened without any conduits, it is possible to enhance the brake responsiveness and reduce the air flow rate, and hence to miniaturize the whole device.

What is claimed is:

1. A brake control device comprising,
   a first conduit connected from a first pressure source through a brake valve to a traction control valve,
   a second conduit connected from a second pressure source to said traction control valve,
   a third conduit connected from said traction control valve to a modulator,
   said modulator controlling the pressure applied to a wheel cylinder, wherein said modulator includes an air over hydraulic cylinder containing an air piston on one side and a hydraulic piston on the other side, and valve device for controlling air pressure in an air chamber on said air piston side,
   said traction control valve positioned between said brake valve and said modulator and adapted to be activated in traction control including,
   a) a valve piston having a first seal body for opening and closing the communication between said second conduit and said third conduit, and a second seal body for opening and closing the communication between said first conduit and said third conduit at both ends thereof, and
   b) a solenoid valve for controlling the supply of an activating air pressure to said valve piston,
      wherein said solenoid valve supplies either of the pressures from said first pressure source or said second pressure source to said modulator.

2. A brake control device according to claim 1, wherein said traction control valve is integrally assembled into a housing of said modulator together with said valve device and said third conduit.

3. A brake control device according to claim 1, the diameter of said first seal body is smaller than the diameter of said second seal body.

* * * * *